United States Patent
Manadhata et al.

(10) Patent No.: US 9,032,527 B2
(45) Date of Patent: May 12, 2015

(54) INFERRING A STATE OF BEHAVIOR THROUGH MARGINAL PROBABILITY ESTIMATION

(75) Inventors: Pratyusa Kumar Manadhata, Piscataway, NJ (US); Sandeep Yadav, Princeton, NJ (US); Prasad V. Rao, Metuchen, NJ (US); Marc R. Eisenbarth, Austin, TX (US); William G. Horne, Lawrenceville, NJ (US); Stuart Haber, New York, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 105 days.

(21) Appl. No.: 13/438,567

(22) Filed: Apr. 3, 2012

(65) Prior Publication Data

US 2013/0179974 A1 Jul. 11, 2013

Related U.S. Application Data

(60) Provisional application No. 61/585,465, filed on Jan. 11, 2012.

(51) Int. Cl.
G06F 12/16 (2006.01)
H04L 29/06 (2006.01)
G06F 21/56 (2013.01)

(52) U.S. Cl.
CPC .............. H04L 63/145 (2013.01); G06F 21/56 (2013.01)

(58) Field of Classification Search
CPC ............................. H04L 63/145; G06F 21/56
USPC .................................................. 726/22–25
See application file for complete search history.

(56) References Cited

U.S. PATENT DOCUMENTS

| | | | |
|---|---|---|---|
| 7,185,367 B2 * | 2/2007 | Munson | 726/23 |
| 7,640,589 B1 | 12/2009 | Mashevsky et al. | |
| 8,161,548 B1 * | 4/2012 | Wan | 726/22 |
| 8,341,745 B1 * | 12/2012 | Chau et al. | 726/24 |
| 2009/0328216 A1 | 12/2009 | Rafalovich et al. | |
| 2011/0083185 A1 | 4/2011 | Sheleheda et al. | |
| 2011/0167495 A1 | 7/2011 | Antonakakis et al. | |
| 2011/0283357 A1 | 11/2011 | Pandrangi et al. | |

FOREIGN PATENT DOCUMENTS

KR 20100078087 7/2010

OTHER PUBLICATIONS

Antonakakis, et al., "Building a Dynamic Reputation System for DNS." USENIX Security Symposium, Aug. 11-13, 2010, Washington, DC, USA, 17 pages.

(Continued)

Primary Examiner — Anthony Brown
(74) Attorney, Agent, or Firm — Brooks, Cameron & Huebsch, PLLC

(57) ABSTRACT

Systems, computer-readable media storing instructions, and methods can infer a state of behavior. Such a method can include constructing a graph including nodes representing hosts and domains based on an event dataset. The graph can be seeded with information external to the event dataset. A belief whether each of the nodes is in a particular state of behavior can be calculated based on marginal probability estimation.

20 Claims, 5 Drawing Sheets

(56) References Cited

OTHER PUBLICATIONS

Bilge, et al., "EXPOSURE: Finding Malicious Domain Using Passive DNS Analysis," Published in 18th Annual Network & Distributed System Security Symposium, Feb. 6-9, 2011, San Diego, CA, USA, 18 pages.

Brin, et al., "The Anatomy of a Large-Scale Hypertextual Web Search Engine," Computer Networks and ISDN Systems 30, Stanford, CA, USA, Apr. 1998, pp. 107-117.

Chau, et al., "Polonium: Tera-Scale Graph Mining for Malware Detection," ACM SIGKDD Conference on Knowledge Discovery and Data Mining, Jul. 25-28, 2010, 9 pages.

Gu, et al., "BotMiner: Clustering Analysis of Network Traffic for Protocol-and Structure-Independent Botnet Detection," Proceedings of the 17th USENIX Security Symposium (Security '08), Jul. 28-Aug. 1, 2008, pp. 139-154.

Jiang, et al., "Identifying Suspicious Activities through DNS Failure Graph Analysis," IEEE Conference on Network Protocols, Oct. 5-8, 2010, pp. 144-153.

John, et al., "Studying Spamming Botnets Using Botlab," In NSDI: Proceedings of the 6th USENIX Symposium on Networked systems and design implementation, Apr. 22-24, 2009, pp. 291-306.

Kang, et al., "Mining Large Graphs: Algorithms, Inference, and Discoveries," International Conference on Data Engineering, Apr. 11-16, 2011, pp. 243-254.

Ma, et al., "Beyond Blacklists: Learning to Detect Malicious Web Sites from Suspicious URLs," Published in ACM SIGKDD International Conference on Knowledge Discovery and Data Mining, Jun. 28-Jul. 1, 2009, pp. 1245-1253.

Murphy, et al., "Loopy Belief Propagation for Approximate Inference: An Empirical Study," Published in UAI'99 Proceedings of the Fifteenth Conference on Uncertainty in Artificial Intelligence, Jul. 30-Aug. 1, 1999, pp. 467-475.

Nagaraja, et al., "BotGrep: Finding P2P Bots with Structured Graph Analysis," USENIX Security Syposium, Aug. 11-13, 2010, 16 pages.

Provos, et al., "All Your iFRAMEs Point to Us," Proceedings of the 17th ACM Security Symposium, Feb. 4, 2008, 22 pages.

Yadav, et al., "Detecting Algorithmically Generated Malicious Domain Names," Internet Measurement Conference, Nov. 1-3, 2010, 14 pages.

Yadav, et al., "Winning with DNS Failures: Strategies for Faster Botnet Detection," In 7th International ICST Conference on Security and Privacy in Communication Networks (SecureComm), Sep. 2011, 10 pages.

Yedida, et al., "Understanding Belief Propagation and its Generalizations," Delivered in the 'Distinguished Lecture' track at the 2001 International Joint Conference on Artificial Intelligence, Aug. 2001, 36 pages.

Yen, "Detecting Stealthy Malware Using Behavioral Features in Network Traffic," Aug. 2011, 123 pages, Carnegie Mellon University, Pittsburg, PA.

\* cited by examiner

| $X_i$ \ $X_j$ | BENIGN | MALICIOUS |
|---|---|---|
| BENIGN | A | A' |
| MALICIOUS | B' | B |

INFERRING A STATE OF BEHAVIOR THROUGH MARGINAL PROBABILITY ESTIMATION

PRIORITY INFORMATION

This application claims priority to U.S. Provisional Patent Application Ser. No. 61/585,465, filed Jan. 11, 2012, which is incorporated by reference herein.

BACKGROUND

An increasing number of hosts are being infected by malicious sets of executable instructions (e.g., malware). Malware infections can spread through email, shared removable drives, visits to malicious websites, domain name system (DNS) cache poisoning or rogue redirects, among others. Most infections are spread by visits to malicious websites. Therefore, preventing users from malicious domain access and identification and isolation of individual host infections can help prevent host infections.

DETAILED DESCRIPTION

Figure 1:
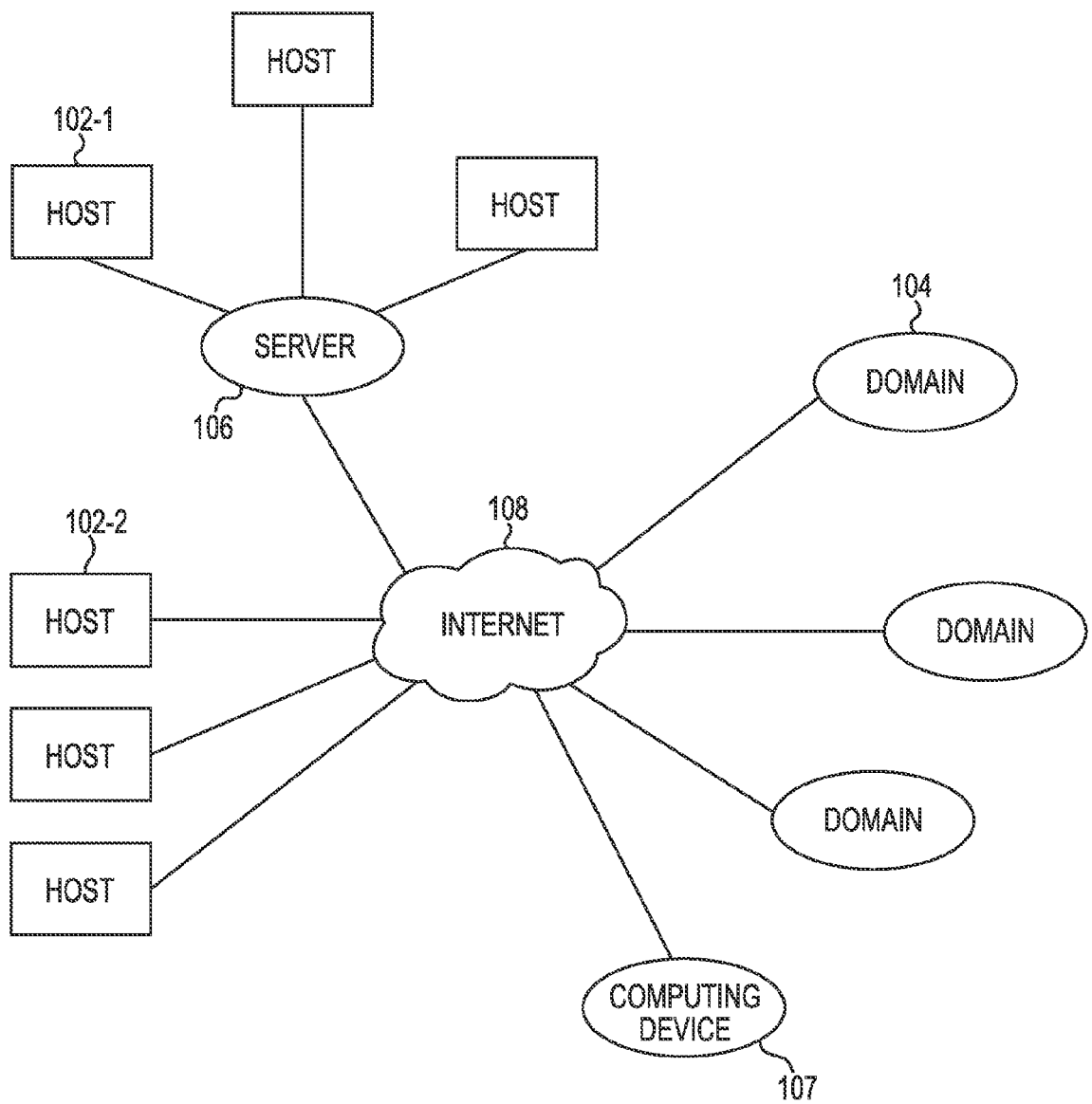
FIG. 1 illustrates an example of a network according to the present disclosure.

With the advent of tablet PCs, netbooks, and smart phones, an ever increasing dependence on the web for various tasks may develop. Malware installed on hosts may be involved in pilfering sensitive data or spreading the malware, aiding nefarious activities such as distributed denial of service (DDoS) attacks, or for spreading spam. The stakes are even higher for enterprise networks where involvement in malicious activities hurts the enterprise's reputation. A user may access hundreds of domains with the number of domains swelling to a greater magnitude with indirect domain access from advertisements and other network configurations.

Finding a malicious domain access in such a large set becomes difficult because of sheer resource requirements. Bots or compromised hosts are also known to utilize system rootkits and other techniques to evade detection methods relying on host analysis. Also, the network or communication activities of such bots may resemble legitimate applications statistically, making them difficult to detect.

Preventing malicious attacks may include the use of DNS blacklists that rely on inputs obtained from several sources incurring a significant delay. Collecting additional information for a large set of domains is resource and time intensive, making application of prevention techniques difficult, especially for large networks. In contrast, some examples of the present disclosure use a relatively small subset of such data (e.g., blacklists). In a number of examples, such information can be limited to the domains that the hosts access.

Some infected host detection techniques rely on network communication patterns where the dataset to be analyzed can become so large that making inferences is problematic for large networks. To identify an infected host, some mechanisms employ static analysis or honeypot-based analysis, which may require manual intervention. A honeypot-based analysis can include the use of a trap (e.g., a computing device, data, or a network site that appears to be part of the network, but may be isolated and monitored) set to detect, deflect, or in some manner counteract malicious behavior. Also, modern malware may be cognizant of such setups and can disable itself to avoid detection. In contrast, some examples of the present disclosure do not require active interference with a host for detection.

Examples of the present disclosure include systems, computer-readable media storing instructions for inferring a state of behavior. Such a method can include constructing a graph including nodes representing hosts and domains based on an event dataset. The graph can be seeded with information external to the event dataset. A belief whether each of the nodes is in a particular state of behavior can be calculated based on marginal probability estimation.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example of a network according to the present disclosure. The network can include a plurality of hosts (e.g., host 102-1 and host 102-2, generally hosts 102) connected to the Internet 108. A host 102-1 can be connected to the Internet via a plurality of servers (e.g., server 106, generally servers 106), or a host 102-2 can be connected to the Internet 108 by other means (e.g., directly). One example of a server 106 can be a proxy server. The hosts 102 can connect to a plurality of domains 104 via the servers 106 and/or the Internet 108. The network can include a computing device 107 (e.g., a server or other computing device including processing resources and memory resources as described herein) that is configured to implement a number of examples of the present disclosure. In some examples, the hosts 102, the servers 106, and/or the computing device 107 can be part of an autonomous system. An autonomous system can include a collection of connected Internet Protocol (IP) routing prefixes under the control of a number of network operators that presents a common routing policy to the Internet 108.

Some examples of the present disclosure can infer the state of behavior (e.g., reputation) of a domain 104 or a host 102 as being malicious behavior, a specific type of malicious behavior (e.g., behavior associated with malware, spam, etc.), benign behavior, and/or a specific type of benign behavior using known information about hosts 102 within the network and/or about the domains 104 that the hosts 102 access. Information about host 102 activity can be obtained from an event dataset such as may be stored in event logs maintained on a number of servers 106 and/or on the hosts 102 themselves, among other locations. An event dataset can include information from a number of network activity logs indicating network activity of a node such as may be included in hypertext transfer protocol (HTTP) logs, DNS logs, and/or dynamic host configuration protocol (DHCP) logs, among others. Information from such event logs can be used to construct a graph (e.g., a bipartite graph). A system for inferring a state of behavior through marginal probability estimation (e.g., including a memory resource and a processing resource coupled to the memory resource) can be implemented, for example, on a computing device 107 (e.g., in an autonomous network) for detection of infected hosts and/or malicious domains during operation of the network.

Figures 2, 5:
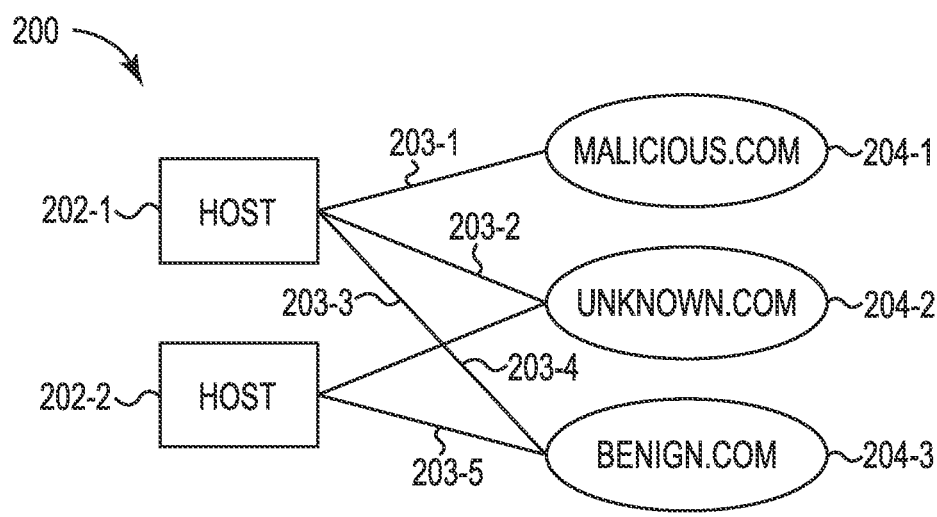
FIG. 2 illustrates an example of a graph according to the present disclosure.
FIG. 5 illustrates an example of an edge potential matrix according to the present disclosure.

FIG. 2 illustrates an example of a graph 200 according to the present disclosure. The graph 200 is a graphical representation of information of the domains accessed (or attempted to be accessed) by the hosts. However, "constructing a graph," as used herein, does not require that a physical or graphical representation of the information actually exists. Rather, such a graph 200 can be represented as a data structure in a tangible medium (e.g., in memory of a computing device). Nevertheless, reference and discussion herein may be made to the graphical representation, which can help the reader to visualize and understand a number of examples of the present disclosure.

The graph includes a plurality of hosts 202-1, 202-2 (generally 202) and a plurality of domains 204-1, 204-2, 204-3 (generally 204). The hosts 202 and the domains 204 are collectively referred to as nodes of the graph 200. The hosts 202 and the domains 204 can each be unique (e.g., the graph 200 does not include more than one entry per host 202 or domain 204). The graph also includes a number of edges 203-1, 203-2, 203-3, 203-4, 203-5 (generally 203). An edge 203 represents an access of a domain 204 by a host 202. For example, the edge 203-1 represents an access by the host 202-1 of the domain 204-1. Such a graph 200 may have overlaps between different hosts 202 and domains 204 (e.g., both the host 202-1 and the host 202-2 accessed the domain 204-2). The order in which a host 202 accesses various domains 204 is irrelevant to the graph 200.

The graph 200 illustrated in FIG. 2 may be a scaled down version of what an actual graph might look like in practice. As a specific example, a graph can be generated based on the following information: 26-hour long HTTP logs, 300 HTTP proxy servers, more than 300,000 hosts, and 5-day long DHCP logs. Such a graph might include approximately two million nodes and 24 million edges. An HTTP log can identify which uniform resource locators (URLs) are accessed by a host (represented through an IP address). The domain can be identified via the URL. Because IP addresses may churn due to dynamic addressing, the DHCP logs can be used to more accurately associate a host 202 with a domain 204 because the DHCP logs can help identify the IP address(es) bound to a host over the duration of the analysis. Each host can be uniquely identified by a media access controller (MAC) address of its network interface. Thus, the graph 200 can represent a network interface as a host 202 node.

The graph 200 can be constructed by determining the affiliation of two types of bindings: first, those domains that an IP address accesses (e.g., as determined from HTTP logs), and second, those IP address(es) that are associated with a MAC address (e.g., as determined from DHCP logs). As described in more detail herein, domains 204 may have a state of behavior (e.g., malicious, a specific type of malicious, benign, a specific type of benign, and/or unknown). Nodes representing unknown domains (e.g., domain 204-2 "unknown.com") can represent unique second-level domains. Considering only the second-level domains may improve the degree distribution of domain nodes, which may increase the probability of the existence of a path between two nodes in the graph. Such a choice is also motivated by the assumption that usually second-level domains are responsible for (mis)happenings within their domain or sub-domains. Thus, this approach may designate a domain example.com as malicious, even if its sub-domain badsite.sub.example.com is actually malicious. It is also worth noting that a domain node may also represent a web server IPv4 address obtained from the HTTP logs. In this case, the complete IPv4 address may be represented as a node in the graph 200. Illegitimate domain names (with no top level domains (TLDs)) may be ignored and the second-level domains may be retrieved from complete domain names.

Figure 3:
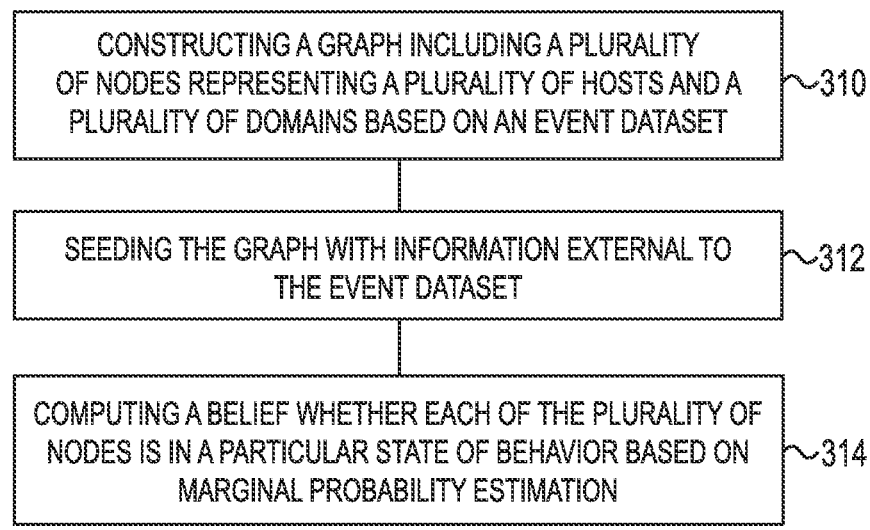
FIG. 3 is flow chart illustrating an example of a method for inferring a state of behavior through marginal probability estimation according to the present disclosure.

FIG. 3 is flow chart illustrating an example of a method for inferring a state of behavior through marginal probability estimation according to the present disclosure. As illustrated at 310, and as described with respect to FIG. 2, the method can include constructing a graph including a plurality of nodes representing a plurality of hosts and a plurality of domains based on an event dataset (e.g., collected from a plurality of proxy servers). The graph is described in more detail with respect to FIG. 2.

At 312, the method can include seeding the graph with information external to the event dataset. An example of such information may be referred to as "ground truth," which may be obtained from third party sources, among others. With respect to the present disclosure, information external to the event dataset (e.g., ground truth) refers to information about nodes that was obtained based on observation rather than based on a probabilistic determination. For example, information external to the event dataset for a domain can be information obtained from a list of malicious nodes (e.g., a blacklist) and/or a list of benign nodes (e.g., a whitelist).

Seeding the graph with information external to the event dataset can include assigning a prior to a node (e.g., a domain) based on the information external to the event dataset indicating an initial likelihood that the node is in a particular state of behavior. Priors can be assigned to nodes (e.g., all nodes) in the graph. As noted above, seeding refers to assigning a prior to a node based on information external to the event dataset, while other priors may be assigned by mechanisms different than seeding (e.g., based on a function), as described herein. A prior can be a numerical value (e.g., a decimal value) assigned to a node that indicates an initial belief regarding a status of the node. Additional detail regarding the same is provided with the discussion of FIG. 4. In some examples, information related to fewer than all of the nodes in a blacklist and/or a whitelist can be used to seed the graph (e.g., in order to have a greater confidence in assigning priors to nodes in the event dataset). For example, one example implementation can use only 5000 of the one million domains in a whitelist.

In some examples, assigning priors to the plurality of nodes can include assigning a prior indicating an equal probability of a particular one of the plurality of nodes being in a particular state or not being in the particular state in response to the information external to the event dataset being silent as to the particular one of the plurality of nodes. In various examples, a prior can be assigned to a node based on a function (e.g., an increasing and/or decreasing sigmoid function) in response to there being no ground truth seeded for one of the plurality of domains, wherein the function varies according to an attribute of the node. The attribute of the node can be a degree (e.g., the number of edges) of the node in the graph (e.g., a node with a large degree can indicate a large popularity such as a number of requests made by or from the node), a frequency of the node in the event dataset (e.g., a node with a greater frequency in the dataset can indicate that the node accessed or was accessed more often), or a number of HTTP requests made by or from the node (e.g., a specific type of popularity).

In some examples, marginal probability estimation can be applied to the seeded graph. Belief propagation for marginal probability estimation can include the use of the priors, which are an initial estimate of the reputation of each node. Belief propagation can also include the use of edge potentials, which define the relationship between two nodes connected by an edge. Edge potentials can be chosen based on the structure of the graph and related factors governing the states of behavior of hosts and domains in a network. An example of an edge potential matrix is described with respect to FIG. 5.

Marginal probability estimation in a graph G=(V,E) with V nodes and E edges, can include estimating the state of behavior of a node based on states of behavior assumed by other graph nodes. The marginal probability estimation problem is NP-Complete. That is, for large graphs, the computation time can increase exponentially with increasing number of nodes. Belief propagation can be a relatively fast approach for computing the marginal probability.

Given a set of random variables, belief propagation can be used for estimating the marginal probability for a variable. The goal generally may be to infer a graph node's state of behavior. In some examples, each node in the graph may be represented as a random variable. To elaborate, given a graph with random variables as nodes with an initial state of behavior distribution, and the relationship between nodes defined by a pre-determined criteria, belief propagation can help infer the probability (or the belief) of a node to be in a particular state of behavior. Belief propagation can compute the marginal probabilities based on messages passed between nodes over multiple iterations. The iterations may be repeated until the system converges to a stable probability distribution of the states of behavior for each node.

The probability of a node i being in a state of behavior $x_i$, is referred to as the belief, denoted by $b_i(x_i)$. The computation of $b_i(x_i)$ may involve two factors: the initial probability of a node being in a state of behavior, and the relationship between two nodes. The initial probability of a node i to be in a state of behavior $x_i$, is called the prior, denoted by $\phi_i(x_i)$. In the context of the belief computation for a graph with hosts and domains as nodes, the states of behavior assumed by nodes in the graph can either be malicious or benign. Another factor that may be involved in applying belief propagation is expressed by the relationship between two nodes i and j, also called the edge potential. The edge potential represents the probability of j being in a state of behavior $x_j$, given that the state of behavior of i is $x_i$, and vice versa. It is denoted by $\psi_{ij}(x_i,x_j)$.

In a graphical model with nodes connected to each other through edges, the computation of a belief can be dependent upon the messages passed over directed edges. A message from i to j which estimates node i's evaluation of node j being in a particular state of behavior $(x_j)$, depends on the prior for node i, the edge potential for i and j, and the message inputs that i obtains from all its neighbors (excluding j). Mathematically, the message is defined as:

$$m_{ij}(x_j) = \sum_{x_i \in S_i} \phi_i(x_i) \psi_{ij}(x_i, x_j) \prod_{k \in N(i) \setminus j} m_{ki}(x_i) \qquad (1)$$

where N(i) represents the neighbors of node i, and $S_j$ represents the set of all states of behavior that node i can be in. Each message $m_{ij}$ gets updated over every iteration and the iterations may stop when all messages converge (e.g., the messages do not change significantly when compared to the previous iteration). The messages may be normalized such that $\Sigma_{x_i \in S_j} m_{ki}(x_i)=1$. Such normalization of messages may prevent underflow.

Belief propagation can be applied during operation of the plurality of hosts and the plurality of domains. The graph can be updated during operation of the plurality of hosts and the plurality of domains.

At 314, the method can include computing a belief whether each of the plurality of nodes is in a particular state of behavior based on marginal probability estimation. For example, the particular state of behavior can be one of malicious behavior, a specific type of malicious behavior, benign behavior, or a specific type of benign behavior. The messages from the converged (e.g., final) iteration of the belief propagation may be used for computing beliefs through the equation $$b_i(x_i) = C\phi(x_i) \prod_{k \in N(i)} m_{ki}(x_i) \qquad (2)$$

where C denotes the normalization constant (that is, ensuring $\Sigma_{x_j \in S_j} b_i(x_j)=1$). In this context of malfeasance detection, the belief value such as $b_i(x_i)=0.6$ means that the node I is malicious with a 60% chance and benign with a 40% chance.

Figure 4:
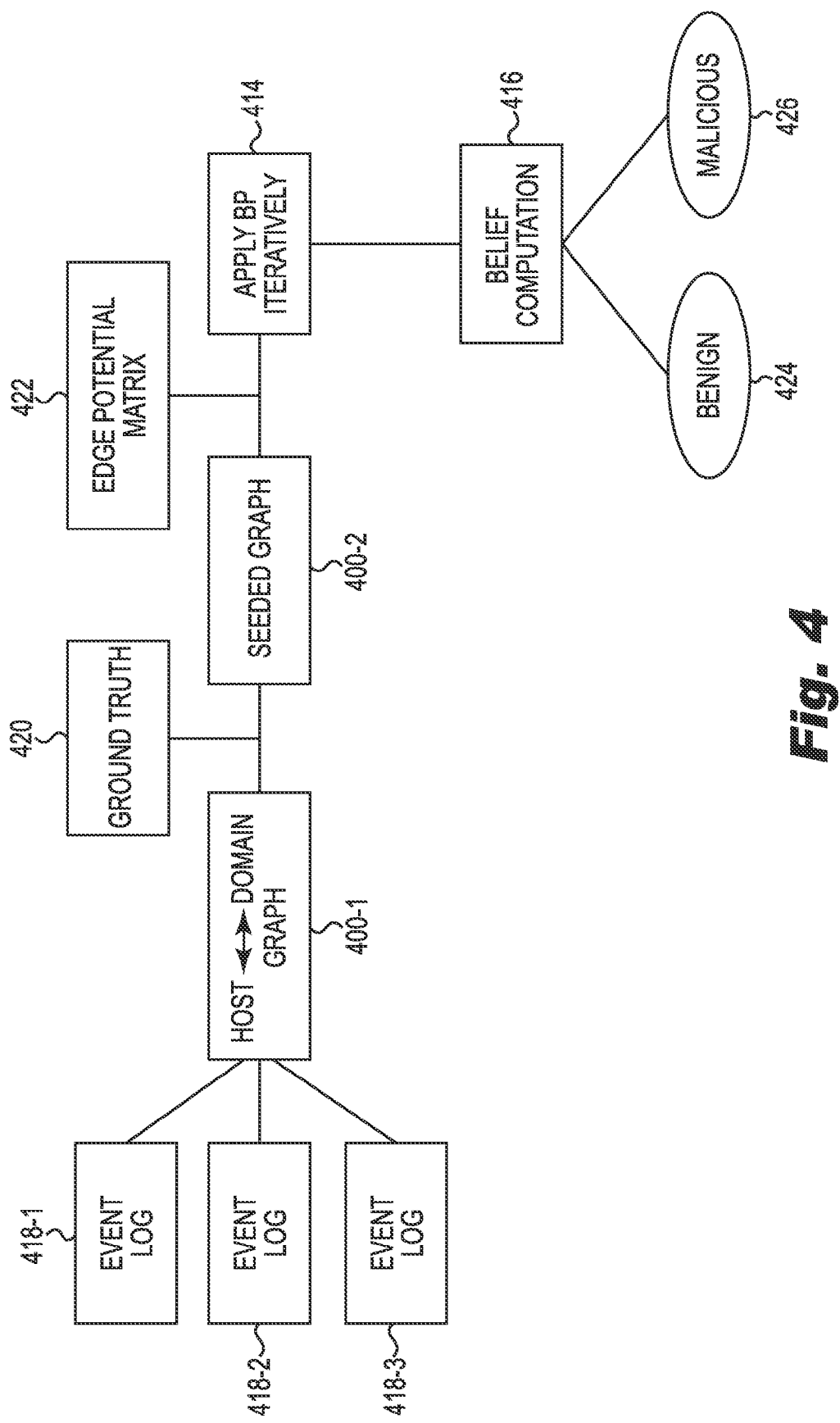
FIG. 4 is a block diagram illustrating an example of a method for inferring a state of behavior through marginal probability estimation according to the present disclosure.

FIG. 4 is a block diagram illustrating an example of a method for inferring a state of behavior through marginal probability estimation according to the present disclosure. An event dataset can be collected from event logs 418-1, 418-2, 418-3 (e.g., of a plurality of servers and/or from a plurality of hosts). A graph 400-1 including a plurality of hosts and a plurality of domains can be constructed based on the event dataset. Once the graph 400-1 is constructed, it can be seeded with information external to the event dataset (e.g., ground truth 420) to create a seeded graph 400-2. Priors can be assigned (e.g., based on ground truth 420) to the plurality of domains based on information in at least one of a list of malicious domains and a list of benign domains. In some examples, priors can also be assigned to the plurality of hosts.

Priors can be based on already established knowledge about the graph, nodes either being malicious or benign. In some examples of the present disclosure a prior of 0.99 can be assigned to domains that appear on a list of malicious domains. A prior of 0.01 can be assigned to domains that appear on a list of benign domains. In various examples, only a subset of the list of malicious domains and/or benign domains are used (e.g., the top 5000 domains). The values of 0.99 and 0.01 reflect that the lists may be imperfect. A domain that does not appear on either a list of malicious domains or benign domains may be assigned a prior of 0.50, reflecting a neutral initial likelihood that it is either malicious or benign. Similarly, hosts (e.g., all hosts) may be assigned a prior of 0.50.

In some examples, rather than assigning a prior of 0.50 to a host and/or domain that does not have seeded ground truth, a sigmoid function can be used to assign a prior. For example, the equation:

$$f(x) = \frac{1}{1 + e^{\frac{-(x-k)}{W}}} \text{ where, } 0 \le f(x) \le 1 \quad (3)$$

where $f(x)=0.5$ when $x=k$. W, the sigmoid width, is a parameter that defines the slope or the rate of increase or decrease of $f(x)$. The sigmoid function can be monotonically increasing or decreasing depending upon the coefficient for $(x-k)$ in equation (3). If the coefficient is negative, $f(x)$ is monotonically increasing and decreasing otherwise.

For example, an increasing sigmoid function can be used to assign priors for unknown host nodes (e.g., where the prior is a function of the number of HTTP requests). An assumption can be made that a large number of HTTP requests indicates higher maliciousness as malware may repeatedly communicate with the rogue master for various activities. The parameter k for the host prior function can be an average number of HTTP requests made by host nodes (e.g., 6219 in one example).

In some examples, a decreasing sigmoid function can be used to assign priors for unknown domain nodes where the function can vary with the degree of the node. A node with a large degree indicates high popularity and thus the function can assign a low prior to the node. In one example, the average domain degree (k in equation (1)) can be nine.

Using constant priors for unknown nodes may perform marginally better for lower false positive rates (e.g., falsely identifying a node as malicious). However, the number of iterations (or the time taken) to converge to final belief values may be significantly less (e.g., half) for sigmoid-based priors with a similar performance.

Belief propagation for marginal probability estimation can be applied 414 to the seeded graph 400-2 using an edge potential matrix 422, which estimates a state of behavior of one of the plurality of domains given a state of behavior of a neighboring one of the plurality of hosts and/or estimates the state of behavior of one of the plurality of hosts given the state of behavior of a neighboring one of the plurality of domains. The edge potential matrix 422 can be established before belief propagation is applied 414 and is described in more detail with respect to FIG. 5.

Belief propagation 414 can be applied iteratively to the graph, where, in each iteration, messages are passed over all the directed edges. Messages can be computed from equation (1) above. The message computation can also depend on the choice of the edge potential matrix, as described in more detail below with respect to FIG. 5. A belief can be computed 416 whether each of the plurality of hosts and the plurality of domains is in a particular state of behavior based on the marginal probability estimation. The state of behavior can include, for example, benign 424 or malicious 426.

FIG. 5 illustrates an example of an edge potential matrix 522 according to the present disclosure. In the edge potential matrix 522, node i and node j have an edge there between. Given a host (e.g., i), if it is assumed to be benign, then the domain (e.g., j) it accesses (represented as a graph edge) may be considered to be benign with a probability of A (e.g., 0.51). If the host is assumed to be benign, then the domain it accesses may be considered to be malicious with a probability of A', where A' is less than A (e.g., in some instances, 1−A, where A>0.5). If the host is assumed to be malicious, then the domain it accessed may be considered to be malicious with a probability of B (e.g., 0.51). If the host is assumed to be malicious, then the domain it accesses may be considered to be benign with a probability of B', where B' is less than B (e.g., in some instances, 1−B, where B>0.5). In some examples, A and B can be equal to 0.51 and A' and B' can be equal to 0.49. Analogous inferences can be made for the state of behavior of a host based on the state of behavior of a domain. Thus, the edge potential matrix 522 can symmetrically estimate the state of behavior of a domain, given a host, and vice versa.

A message value can be sensitive to the choice of the edge potential matrix 522. For high degree nodes, the outgoing message can converge to specific elements of the edge potential matrix 522. Other example values for A, A', B, and B' can include A=0.75, A'=0.25, B=0.51, and B'=0.49. With respect to these values in the edge potential matrix 522, performance in terms of detection rates and corresponding false positive rates can be relatively the same as for the previous example. However, the convergence rate can be enhanced (e.g., three or more times faster) and performance for even initial iterations can be very close to that of converging iterations.

Priors can be assigned and the edge potential matrix can be established before belief propagation is applied to compute a belief whether each node is in a particular state of behavior (e.g., a reputation of each node). The reputation can be inferred through message passing. The reputation of each node is the marginal probability estimated through belief propagation and is used to label a node (e.g., as either malicious or benign). Since an outgoing message from a node is dependent on messages sent from its neighbors, equation (1) for a large number of neighbors can lead to underflow. To counter such a problem, a data type for storing extremely small decimal values can be used in addition to normalizing messages.

Belief propagation can be iteratively applied until the messages (e.g., all of the messages) converge. A converged message $m_{ij}$ can outline i's estimate of j being in a state of behavior, and that estimate can reach an equilibrium that does not change considerably over time. Once the messages have converged, the beliefs can be computed using equation (2). The beliefs, when normalized, can indicate the relative reputation of the nodes (e.g., from 0.0 to 1.0). A number of thresholds can be selected to designate the reputation of each of the nodes as malicious, benign, or otherwise for given values of the beliefs.

Figure 6:
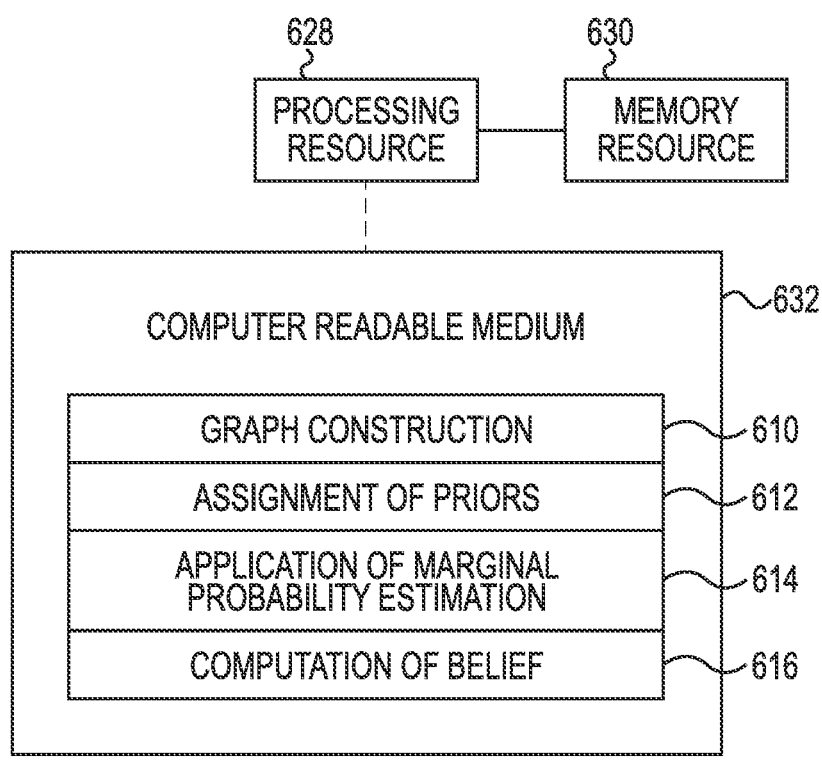
FIG. 6 is a block diagram illustrating a processing resource, a memory resource, and a computer readable medium according to the present disclosure.

FIG. 6 is a block diagram illustrating a processing resource 628, a memory resource 630, and a computer readable medium 632 according to the present disclosure. The computer readable medium 632 (e.g., a tangible, non-transitory medium) and/or the memory resource 630 can store a set of instructions executable by the processing resource 628 to construct 610 a graph including a plurality of nodes representing hosts and domains, and a plurality of edges, each edge connecting a respective one of the plurality of hosts that has accessed a respective one of the plurality of domains. The instructions can be executed to assign 612 priors to the plurality of domains based on information in at least one of a list of malicious domains and a list of benign domains. The instructions can be executed to apply 614 marginal probability estimation (e.g., including belief propagation iteratively for marginal probability estimation) to the graph by passing a respective message over each of the plurality of edges in each iteration until values of the messages converge. The instructions can be executed to compute 616 a belief whether each of the plurality of hosts and the plurality of domains is in a particular state of behavior based on the marginal probability estimation.

The respective message can estimate an evaluation of a first of the plurality of nodes as to the state of behavior of a second of the plurality of nodes dependent on the prior for the first node and a number of message inputs that the first node has received from others of the plurality of nodes that share and edge with the first node. The belief propagation can use an edge potential matrix (e.g., edge potential matrix 522 illustrated and described with respect to FIG. 5) including a plurality of edge potentials, which estimate the state of behavior of one of the plurality of nodes given the state of behavior of a neighboring one of the plurality of nodes. The respective message can estimate the evaluation based also on the edge potential for the first node and the second node.

The methods, techniques, systems, and apparatuses described herein may be implemented in digital electronic circuitry or computer hardware, for example, by executing instructions stored in computer-readable storage media. Apparatuses implementing these techniques may include appropriate input and output devices, a computer processor, and/or a tangible computer-readable storage medium storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and the desired results still may be achieved. Similarly, components in the disclosed systems may be combined in a different manner and/or replaced or supplemented by other components and the desired results still may be achieved.

What is claimed is:

1. A computing-device implemented method for inferring a state of behavior, comprising:
   constructing, by a computer, a graph based on an event dataset, the graph including a plurality of nodes, wherein the nodes represent a plurality of hosts and a plurality of domains;
   seeding, by the computer, the graph with information external to the event dataset;
   assigning, by the computer, a prior to each node among the plurality of nodes, wherein each of the priors are based on knowledge associated with the graph and each of the priors includes a numerical value indicating an initial belief regarding a status of an associated node among the plurality of nodes, and wherein:
   assigning the prior to each of the plurality of nodes includes assigning the prior to a respective one of the plurality of nodes based on a function, wherein the function varies with an attribute of the node and wherein the attribute of the node comprises a frequency of the node in the event dataset and a number of hypertext transfer protocol (HTTP) requests made by the node; and
   computing, by the computer, a belief whether each of the plurality of nodes is in a particular state of behavior based on marginal probability estimation.

2. The method of claim 1, wherein the method further comprises:
   updating, by the computer, the graph during operation of the plurality of hosts and the plurality of domains; and
   applying, by the computer, the marginal probability estimation to the seeded graph during operation of the plurality of hosts and the plurality of domains, wherein the marginal probability estimation is based on the assigned priors.

3. The method of claim 1, wherein seeding the graph with information external to the event dataset includes assigning a prior to at least one of the plurality of nodes based on the information external to the event dataset indicating an initial likelihood that the at least one of the plurality of nodes is in the particular state of behavior.

4. The method of claim 3, wherein assigning priors to the plurality of nodes includes assigning a prior indicating an equal probability of a particular one of the plurality of nodes being in the particular state or not being in the particular state in response to the information external to the event dataset being silent as to the particular one of the plurality of nodes.

5. The method of claim 1, wherein the function comprises a sigmoid function.

6. The method of claim 1, wherein assigning the prior to the respective one of the plurality of nodes based on the function includes assigning the prior based on the function in response to there being no information external to the event dataset seeded for the respective one of the plurality of nodes.

7. The method of claim 1, wherein the state of behavior comprises one of a group of states of behavior including malicious behavior, a specific type of malicious behavior, benign behavior, and a specific type of benign behavior.

8. A non-transitory computer-readable medium storing a set of instructions executable by a processing resource to:
   construct a graph based on an event dataset, the graph including a plurality of edges and a plurality of nodes, wherein the nodes represent a plurality of hosts and a plurality of domains, wherein each edge connects a respective one of the plurality of hosts to a respective one of the plurality of domains that the respective one of the plurality of hosts has accessed;
   assign a prior to each node among the plurality of nodes, wherein each of the priors are based on knowledge associated with the graph and each of the priors includes a numerical value indicating an initial belief regarding a status of an associated node among the plurality of nodes, and wherein assigning the prior to each of the nodes among the plurality of nodes includes assigning the prior to a respective one of the plurality of nodes based on a function, wherein the function varies with an attribute of the node and wherein the attribute of the node comprises a frequency of the node in the event dataset and a number of hypertext transfer protocol (HTTP) requests made by the node;
   apply marginal probability estimation to the graph; and
   compute a belief whether each of the plurality of nodes is in the particular state of behavior based on the marginal probability estimation.

9. The medium of claim 8, wherein:
   the marginal probability estimation is applied via belief propagation by passing a respective message over each of the plurality of edges in each iteration until values of the messages converge; and the respective message estimates an evaluation of a first of the plurality of nodes as to the state of behavior of a second of the plurality of nodes dependent on the prior for the first node and a number of message inputs that the first node has received from others of the plurality of nodes that share an edge with the first node.

10. The medium of claim 9, wherein:
the graph comprises a bipartite graph;
the application of the belief propagation uses an edge potential matrix including a plurality of edge potentials, which estimate the state of behavior of one of the plurality of nodes given the state of behavior of a neighboring one of the plurality of nodes; and
the respective message estimates the evaluation based also on the edge potential for the first node and the second node.

11. A system for inferring a state of behavior, comprising:
a memory resource; and
a processing resource coupled to the memory resource, to:
construct a graph based on an event dataset collected from event logs, the graph including a plurality of nodes, the plurality of nodes including a plurality of hosts and a plurality of domains, and the graph further including a plurality of edges between various ones of the plurality of hosts and the plurality of domains;
assign a prior to each node among the plurality of nodes, wherein each of the priors are based on knowledge associated with the graph and each of the priors includes a numerical numerical value indicating an initial belief regarding a status of an associated node among the plurality of nodes, and wherein assigning the prior to each of the plurality of nodes includes assigning the prior to a respective one of the plurality of nodes based on a function, wherein the function varies with an attribute of the node and wherein the attribute of the node comprises a frequency of the node in the event dataset and a number of hypertext transfer protocol (HTTP) requests made by the node;
apply belief propagation to the graph using an edge potential matrix to determine a marginal probability estimation, wherein the edge potential matrix estimates a state of behavior of one of the plurality of domains given a state of behavior of a neighboring one of the plurality of hosts and/or estimates the state of behavior of one of the plurality of hosts given the state of behavior of a neighboring one of the plurality of domains; and
compute a belief whether each of the plurality of hosts and the plurality of domains is in a particular state of behavior based on the marginal probability estimation.

12. The system of claim 11, wherein:
the graph comprises a bipartite graph based on the event dataset collected from a plurality of servers, wherein the event dataset is stored on one or more of the plurality of nodes, and wherein the event dataset is selected from at least one of the group of event datasets including a hypertext transfer protocol (HTTP) proxy log dataset, a dynamic host configuration protocol (DHCP) log dataset, and a domain name system (DNS) log dataset; and
the system is implemented on a computing device in an autonomous network for detection of infected hosts and/or malicious domains during operation of the network.

13. The system of claim 12, wherein the processing resource is coupled to the memory resource to determine an affiliation between each of the plurality of domains and each of a plurality of Internet protocol (IP) addresses and between each of the plurality of IP addresses and a media access controller (MAC) address of each of the plurality of hosts.

14. The method of claim 5, wherein the function comprises an increasing sigmoid function.

15. The method of claim 5, wherein the function comprises a decreasing sigmoid function.

16. The method of claim 1, wherein the event dataset includes information from a network activity log indicating network activity of each of the plurality of nodes.

17. The method of claim 1, wherein the graph includes a plurality of edges, each edge among the plurality of edges representing an instance of a domain among the plurality of domains accessing a host among the plurality of hosts.

18. The method of claim 17, further comprising associating, using the computer, a host among the plurality of hosts with a domain among the plurality of domains using a domain host configuration protocol.

19. The method of claim 1, wherein a domain among the plurality of domains comprises an unknown domain.

20. The method of claim 1, wherein constructing the graph includes excluding domains without a top level domain.

* * * * *

UNITED STATES PATENT AND TRADEMARK OFFICE
CERTIFICATE OF CORRECTION

PATENT NO. : 9,032,527 B2  Page 1 of 1
APPLICATION NO. : 13/438567
DATED : May 12, 2015
INVENTOR(S) : Pratyusa Kumar Manadhata et al.

It is certified that error appears in the above-identified patent and that said Letters Patent is hereby corrected as shown below:

In column 11, line 30, in Claim 11, delete "numerical numerical" and insert -- numerical --, therefor.

Signed and Sealed this
Twenty-second Day of March, 2016

Michelle K. Lee
*Director of the United States Patent and Trademark Office*